United States Patent Office 3,833,584

Patented Sept. 3, 1974

3,833,584

4-SUBSTITUTED-AMINO-QUINAZOLINES AND NITRATES THEREOF

Lloyd P. Gabel and William R. J. Simpson, Morris Plains, N.J., assignors to Sandoz-Wander, Inc., Hanover, N.J.

No Drawing. Application June 26, 1969, Ser. No. 838,050, now Patent No. 3,637,701, dated Jan. 25, 1972, which is a continuation-in-part of abandoned application Ser. No. 803,933, Mar. 3, 1969. Divided and this application Aug. 2, 1971, Ser. No. 168,446

Int. Cl. C07d *51/48*

U.S. Cl. 260—256.4 Q 7 Claims

ABSTRACT OF THE DISCLOSURE

The invention disclosed compounds of the class which are nitrates of 4-substituted-amino-quinazolines, e.g., 4-(2-hydroxyethyl)amino - 6,7 - dimethoxyquinazoline nitrate, having pharmacological activity in animals and useful, for example, as hypotensive and anti-anginal agents. Also disclosed are the hydroxy intermediates useful in preparation of said nitrates.

This application is a division of copending application Ser. No. 838,050, filed June 26, 1969, now U.S. Letters Patent 3,637,701, issued Jan. 25, 1972, which, in turn, is a continuation-in-part of application Ser. No. 803,933, filed Mar. 3, 1969, now abandoned.

This invention relates to quinazoline derivatives, and more particularly to compounds which are substituted at the 4-position by an amino function bearing a hydroxyalkyl nitrate. The invention also relates to pharmaceutical methods and compositions utilizing said compounds.

The compounds of the invention may be represented by the structural formula I:

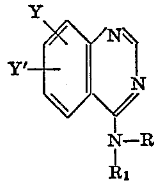

I

I wherein

R is from the group of:

(a) $-CH_2(-CH_2)_n-ONO_2$ (b) $-CH_2\left(-\overset{R^\circ}{\overset{|}{C}H}\right)_n-ONO_2$ (c) $-\overset{R'}{\overset{|}{C}H}(-CH_2)_n-ONO_2$ (d) $-CH_2(-CH_2)_z-N[-CH_2(-CH_2)_z-ONO_2]_2$ $R_1$ is from the group of:

(e) hydrogen, (f) lower alkyl of 1 to 4 carbon atoms, (g) one of the group of (a), (b) and (c) as above defined provided R is from the group of (a) and (b) as above defined, provided that any *y* is 1 or 2 and provided that R and $R_1$ together do not provide more than two nitrate groups, or R and $R_1$ together with the 4-amino nitrogen attached to the quinazoline ring form

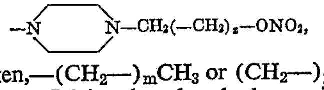

R° is hydrogen, $-(CH_2-)_mCH_3$ or $(CH_2-)_yONO_2$, provided that one R° is other than hydrogen in each of R and $R_1$ which is (b) as defined, and provided that the sum of *n* and *m* does not exceed 6 and the sum of *n* and *y* does not exceed 7, R′ is $-(CH_2-)_xCH_3$ or $-(CH_2-)_yONO_2$,

*n* is 1 to 6,

*m* is 0 to 4,

*x* is 0 to 1,

*y* is 1 to 4,

*z* is 1 to 4, and each of Y and Y′ is, independently, hydrogen, halo of atomic weight of from 19 to 36, or lower alkoxy of from 1 to 4 carbon atoms, preferably 1 to 2 carbon atoms, or both Y and Y′ together form methylenedioxy, or a pharmaceutically acceptable acid addition salt thereof.

A preferred method for preparation of the compounds of formula I involves in a Step A reaction the nitration of the corresponding hydroxy compound of formula II:

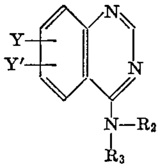

II wherein Y and Y′ are as defined and $R_2$ and $R_3$ are the non-nitrate bearing hydroxy groups corresponding to R and $R_1$, respectively, i.e.:

$R_2$ is from the group of:

(a) $-CH_2(-CH_2)_n-OH$ (b) $-CH_2(-\overset{R^\circ_a}{\overset{|}{C}H})_n-OH$ (c) $-\overset{R'_a}{\overset{|}{C}H}(-CH_2)_n-OH$ (d) $-CH_2(-CH_2)_z-N[-CH_2(-CH_2)_z-OH]_2$ $R_3$ is from the group of:

(e) hydrogen, (f) lower alkyl of 1 to 4 carbon atoms, (g) one of the group of (a), (b) and (c) as above defined provided $R_2$ is from the group of (a) and (b) as above defined, provided that any *y* is 1 or 2 and provided that $R_2$ and $R_3$ together do not provide more than two hydroxy groups, or $R_2$ and $R_3$ together with the nitrogen atom to which they are attached form:

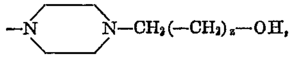

$R_a$° is hydrogen, $-(CH_2-)_mCH_3$ or $(CH_2-)_yOH$, provided that one $R_a$° is other than hydrogen in each of $R_2$ and $R_3$ which is (b) as defined, and provided that the sum of *n* and *m* does not exceed 6 and the sum of *n* and *y* does not exceed 7, is $-(CH_2-)_xCH_3$ or $-(CH_2-)_yOH$, and

*n*, *m*, *x*, *y* and *z* are as defined.

The preparation of compounds I by Step A involves a nitration reaction which may be carried out in a manner known per se for nitrating hydroxyalkyl group. A preferred method of conducting the nitration involves the reaction of a compound II with nitric acid in presence of a carboxylic acid anhydride which is preferably of from 3 to 8 carbon atoms, more preferably acetic acid anhydride. The reaction may be suitably carried out in an organic solvent medium at temperatures in the range of from minus 10° C. to 50° C., preferably 5° C. to 20° C. The solvent medium for the reaction is preferably provided by employing a lower aliphatic carboxylic acid, e.g., acetic acid, although other well-known organic solvents may be employed or the reaction may be carried out employing an excess of the carboxylic acid anhydride. The product compound I may be isolated from the reaction mixture of Step A by working up by established procedures.

A preferred method for preparation of compounds II involves a Step B reaction of a 4-chloroquinazoline of formula III:

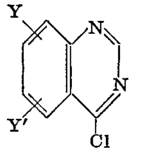

III wherein Y and Y′ are as defined, with a compound of formula IV:

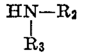

IV wherein $R_2$ and $R_3$ are as defined.

The reaction of Step B is of known type and may be carried out in a conventional manner by subjecting the compound III to reaction with the compound IV in an organic solvent at elevated temperatures which may be suitably in the range of 30° C. to 150° C., preferably 50° C. to 100° C. The reaction is carried out in an inert organic solvent which may be any of several of the well-known conventional solvents, preferably an aromatic solvent such as benzene. Another preferred solvent is isopropanol. Alternately, the reaction may be carried out in the inert liquid medium provided by employing an excess of compound IV. An acid binding agent such as sodium carbonate may be also employed to advantage in the reaction, if desired. The reaction product compound II may be isolated from the reaction mixture of Step B by established procedures.

Also within the scope of the novel compounds of the invention are pharmaceutically acceptable salts not materially affecting the pharmacological effect of the compounds of formula I. Such salts include the acid addition salts, e.g., the hydrochloride, fumarate, citrate, malonate, tartrate methane sulfonate, salicylate, hydronitrate and hydrosulfate. The acid addition salts may be produced as desired from the corresponding free bases by conventional procedures. A convenient method for preparation of acid addition salts involves the use of a buffer system as exemplified in Example 12, Step C. Conversely, the free bases may be obtained from the salts by known procedures.

The compounds of formulae III and IV are either known or may be prepared from known materials by established procedures.

The compounds of formula I and their pharmaceutically acceptable acid addition salts are useful because they possess pharmacological activity in animals. In particular, the compounds are useful as hypotensive agents, as indicated by a lowering of blood pressure on intravenous administration to the anesthetized dog. The compounds of the invention are further useful as coronary dilators, as indicated on intravenous administration to the anesthetized dog and measurement of bloow flow through the anterior descending branch of the left coronary artery.

The compounds of the invention are also useful as antianginal agents based on indications from the performance of the compounds in animals in the above-indicated hypotensive and coronary dilation determinations. In determining significant antianginal activity we prefer to apply two additional pharmacological tests. A first such test involves a determination of the arithmetic difference between aortic blood pressure and large coronary artery segmental pressure in the anesthetized dog according to the method basically described by W. M. Fam et al., Circulation Research, 22: 649–659, 1968. The second test is in vitro by a comparison of the affect of suitable reference agents and the compounds of the invention on the tone and autothythmicity of isolated guinea pig taenia coli strips, including the effect on membrane electrical potential according to the method basically described by Imai et al., J. Pharmacol. Exp. Therap., *156*: 557–564, 1967. By the two last mentioned tests it is indicated that the compounds of the invention having significant antianginal activity are those in which Y and Y′ together represent 6,7-dialkoxy or together form 6,7-methylenedioxy. The more preferred compounds of the invention are, for example, those of Examples 4, 7, and 12 as given hereinafter.

The compounds of formula I are also useful as bronchodilators as indicated *in vitro* on isolated guinea pig tracheal strips.

For the above uses, the compounds may be combined with a pharmaceutically acceptable carrier, and such other conventional adjuvants as may be necessary, and administered orally in such forms as tablets, capsules, elixirs, suspensions and the like or parenterally in the form of an injectable solution or suspension. For the above-mentioned uses, the dosage administered will, of course, vary depending upon the compounds used, the therapy desired and the mode of administration. However, in general, satisfactory results are obtained when administered at a daily dosage of from about 0.1 milligrams to about 50 milligrams per kilogram of body weight, preferably given in divided doses 2 to 4 times a day, or in sustained release form. For most mammals the administration of from about 8 milligrams to about 300 milligrams of the compound per day provides satisfactory results and dosage forms suitable for internal administration comprise from about 2 milligrams to about 150 milligrams of the compound in admixture with a solid or liquid pharmaceutical carrier or diluent.

For above usages, oral administration with carriers may take place in such conventional forms as tablets, dispersible powders, granules, capsules, syrups and elixirs. Such compositions may be prepared according to any method known in the art for the manufacture of pharmaceutical compositions, and such compositions may contain one or more conventional adjuvants, such as sweetening agents, flavoring agents, coloring agents and preserving agents, in order to provide an elegant and palatable preparation. Tablets may contain the active ingredient in admixture with conventional pharmaceutical excipients, e.g., inert diluents such as calcium carbonate, sodium carbonate, lactose and talc, granulating and disintegrating agents, e.g., starch and alginic acid, binding agents, e.g., starch, gelatin and acacia, and lubricating agents, e.g., magnesium stearate, stearic acid and talc. The tablets may be uncoated or coated by known techniques to delay disintegration and adsorption in the gastro-intestinal tract and thereby provide a sustained action over a longer period. Similarly, suspensions, syrups and elixirs may contain the active ingredient in admixture with any of the conventional excipients utilized for the preparation of such compositions, e.g., suspending agents (methylcellulose, tragacanth and sodium alginate), wetting agents (lecithin, polyoxyethylene stearate and polyoxethylene sorbitan monooleate) and preservatives (ethyl-p-hydroxybenzoate). Capsules may contain the active ingredient alone or admixed with an inert solid diluent, e.g., calcium carbonate, calcium phosphate and kaolin. The preferred pharmaceutical compositions from the standpoint of preparation and ease of administration are solid compositions, particularly hard-filled capsules and tablets.

A representative formulation is a tablet prepared by conventional tabletting techniques and containing the following ingredients:

| Ingredient: | Weight (mg.) |
|---|---|
| 4 - [3 - bis(hydroxyethyl)aminopropylamino]-6,7-dimethoxyquinazoline dinitrate dimethanesulfonate | 25 |
| Tragacanth | 10 |
| Lactose | 197.5 |
| Corn starch | 25 |
| Talcum | 15 |
| Magnesium stearate | 2.5 |

The intermediates of formula II and especially those in which Y and Y′ are 6,7-dialkoxy or methylenedioxy are also useful as hypotensive agents and as coronary dilators as indicated in animals by the above-described tests. For such uses these compounds may be administered at daily dosages of from 0.2 milligrams to 50 milligrams per kilogram of body weight.

The following examples show representative compounds encompassed within the scope of this invention and the manner in which such compounds are prepared. However, it is to be understood that the examples are for purposes of illustration only.

EXAMPLE 1

4-(2-Hydroxyethyl)amino-6,7-dimethoxyquinazoline nitrate hydronitrate

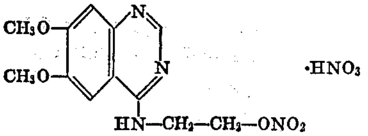

Step A: Preparation of 4-(2-hydroxyethyl)amino-6,7-dimethoxy quinazoline.—A solution of 12 g. of 4-chloro-6,7-dimethoxy quinazoline in 100 ml. of dry benzene containing 9.75 g. of 2-amino ethanol is heated at reflux temperature for 6 hours. After cooling, the crystalline product is filtered off, washed with benzene and with methanol, dried, and crystallized from methanol to obtain 4-(2-hydroxyethyl)amino-6,7-dimethoxy quinazoline, m.p. 232–234° C.

Step B: Preparation of 4-(2-hydroxyethyl)amino-6,7-dimethoxyquinazoline nitrate hydronitrate.—A solution of 5 g. of 4-(2-hydroxyethyl)amino-6,7-dimethoxy quinazoline in 100 ml. of glacial acetic acid is added dropwise to a stirred mixture of 8.39 g. of acetic anhydride and 2.96 ml. of 90% nitric acid at 5–10° C. Stirring is continued for an additional 1.5 hours after which 200 ml. of dry diethyl ether is added to give a crystalline material which is filtered off, washed with further dry ether, dried and crystallized from methanol to give 4-(2-hydroxyethyl) amino-6,7-dimethoxyquinazoline nitrate hydronitrate, m.p. 210° C. (decomp.). A sample was recrystallized from methanol, m.p. 210° (decomp.).

EXAMPLE 2

4-(2-Hydroxyethyl)amino-6,7-dimethoxyquinazoline nitrate and methanesulfonate salt

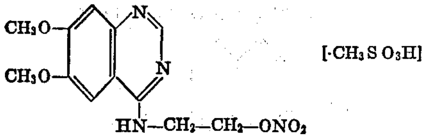

A mixture of 6.5 g. of 4-(2-hydroxyethyl)amino-6,7-dimethoxyquinazoline nitrate hydronitrate with 3.36 g. of sodium hydrogen carbonate and 100 ml. of water is stirred at 0° C. for 1 hour. The mixture is then extracted with 200 ml. of ethyl acetate and the organic phase dried and evaporated *in vacuo* to obtain 4-(2-hydroxyethyl) amino-6,7-dimethoxyquinazoline nitrate, m.p. 270° C., decomp.).

The above product in the amount of 4.8 g. is dissolved in 100 ml. of chloroform and the resulting solution is combined with 1.29 g. of methane sulfonic acid in 30 ml. of chloroform at 0° C. Thereafter the mixture is evaporated *in vacuo* to remove solvent and give a white crystalline solid which is washed with diethyl ether and dried to give 4-(2-hydroxyethyl)amino-6,7-dimethoxyquinazoline nitrate methanesulfonate, m.p. 119–121° C.

EXAMPLE 3

4-(3-Hydroxypropyl)amino-6,7-dimethoxyquinazoline nitrates

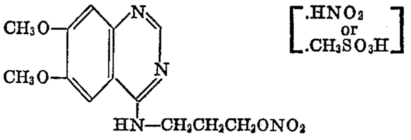

(A) Following the procedure of Step A of Example 1 and employing the appropriate corresponding starting material in approximately equivalent amounts there is obtained on crystallization from methanol-water the compound 4-(3-hydroxypropyl)amino-6,7-dimethoxyquinazoline, m.p. 167–168° C.

(B) Following the procedure of Step B of Example 1, the product of (A), above, is reacted with nitric acid in the presence of acetic acid anhydride to obtain on crystallization from methanol/diethyl ether the compound 4-(3 - hydroxypropyl)amino-6,7-dimethoxyquinazoline nitrate hydronitrile, m.p. 132–135° C. (decomp.).

(C) Following the procedure of Example 2 (first paragraph), the product of (B), above, is reacted with sodium hydrogen carbonate to obtain on crystallization from ethyl acetate the compound 4-(3-hydroxypropyl)amino-6,7-dimethoxyquinazoline nitrate, m.p. 270° C. (decomp.).

(D) Following the procedure of Example 2 (second paragraph), the product of (C), above, is reacted with methane sulfonic acid to obtain (4-(3-hydroxy)amino-6,7-dimethoxyquinazoline nitrate methanesulfonate, m.p. 145.5–147° C. (decomp).

EXAMPLE 4

4-Di(2-hydroxyethyl)amino-6,7-dimethoxyquinazoline nitrate hydronitrate

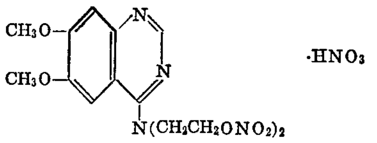

Step A: Preparation of 4-di(2-hydroxyethyl)amino-6,7-dimethoxyquinazoline.—A mixture of 5 g. of 6,7-dimethoxy-4-chloroquinazoline, 5 g. of diethanolamine and benzene is heated at reflux for 18 hours and the resulting benzene solution decanted and cooled to 5° C. to form a solid material which is filtered off, washed with benzene, and crystallized from ethyl acetate to obtain 4-di(2-hydroxyethyl)amino-6,7-dimethoxyquinazoline, m.p. 139° C.

Step B: Preparation of 4-di(2-hydroxyethyl)amino-6,7-dimethoxyquinazoline nitrate hydronitrate.—A solution of 2.93 g. of 4-di(2-hydroxyethyl)amino-6,7-dimethoxyquinazoline in 20 ml. of acetic acid is added to a mixture of 7.3 g. of acetic anhydride and 3.35 g. of nitric acid which has been cooled to minus 10° C. The resulting mixture is allowed to warm to plus 10° C. and stirred for 0.5 hours. The resulting mixture is treated by addition of 200 ml. of diethyl ether to obtain a precipitate which is filtered off and washed with fresh ether and cold dry methanol (0° C.). This residue is then crystallized from aqueous methanol-diethyl ether to obtain 4-di(2-hydroxyethyl)amino-6,7-dimethoxyquinazoline nitrate hydronitrate, m.p. 145° C. (decomp.).

EXAMPLE 5

Following the procedure of the preceding Examples and employing the appropriate corresponding starting materials in approximately equivalent amounts, the following compounds of the invention are readily prepared.

(a) 4-(2-hydroxyethyl)amino-quinazoline nitrate, m.p. 183–185° C. (decomp.).

(b) 4-(3-hydroxypropyl)amino-quinazoline nitrate hydronitrate, m.p. 125–126° C.

(c) 4-(2-hydroxyethyl)amino - 7 - methoxyquinazoline nitrate hydronitrate, m.p. 143–149° C. (decomp.).

(d) 4-(2 - hydroxyethyl)amino - 6 - chloroquinazoline nitrate hydronitrate, m.p. 151–153° C. (decomp.).

(e) 4-(2 - hydroxyethyl)amino - 7 - chloroquinazoline nitrate hydronitrate, m.p. 148–150° C. (decomp.).

(f) 4-(3-hydroxypropyl)amino - 6,7 - diethoxyquinazoline nitrate hydronitrate, m.p. 143° C. (decomp.).

(g) 4-di(2 - hydroxyethyl)amino - 6,7 - diethoxyquinazoline dinitrate hydronitrate, m.p. 150° C. (decomp.).

(h) 4-di(2-hydroxyethyl)amino - quinazoline dinitrate hydronitrate, m.p. 180° C. (decomp.).

EXAMPLE 6

4-(4-Hydroxybutyl)amino-6,7-dimethoxyquinazoline nitrates

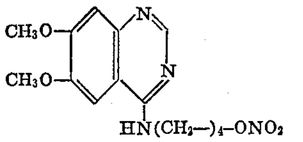

By following procedures similar to those of the preceding Examples the following are prepared:

(A) 4 - (4 - hydroxybutyl)amino-6,7-dimethoxyquinazoline, m.p. 148.5–149.5° C.
(Reaction solvent: toluene)
(Crystallized from: ethyl acetate)

(B) 4 - (4 - hydroxybutyl)amino-6,7-dimethoxyquinazoline nitrate hydronitrate
(Reaction solvent: acetic acid)

(C) 4 - (4 - hydroxybutyl)amino-6,7-dimethoxyquinazoline nitrate
Reaction solvent: ice water)

(D) 4 - (4 - hydroxybutyl)amino-6,7-dimethoxyquinazoline nitrate methanesulfonate, m.p. 129–131° C.
(Reaction solvent: cholorform)
(Crystallization from: methanol/diethyl ether).

EXAMPLE 7

4-(5-Hydroxypentyl)amino-6,7-dimethoxyquinazoline nitrates

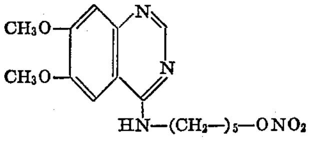

By following procedures similar to those of the preceding Examples the following are prepared:

(A) 4 - (5 - hydroxypentyl)amino-6,7-dimethoxyquinazoline m.p. 145–146° C.
(Reaction solvent: toluene)
(Crystallized from: ethyl acetate)

(B) 4 - (5 - hydroxypentyl)amino-6,7-dimethoxyquinazoline nitrate hydronitrate
(Reaction solvent: acetic acid)

(C) 4 - (5 - hydroxypentyl)amino-6,7-dimethoxyquinazoline nitrate
(Reaction solvent: dimethylacetamide)

(D) 4 - (5 - hydroxypentyl)amino-6,7-dimethoxyquinazoline nitrate methanesulfonate, m.p. 133–134.5° C.
(Reaction solvent: choroform)
(Crystallization from: abs. ethanol/diethyl ether).

EXAMPLE 8

4-(6-Hydroxyhexyl)amino-6,7-dimethoxyquinazoline nitrates

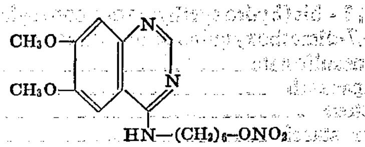

By following procedures similar to those of the preceding Examples the following are prepared:

(A) 4 - (6 - hydroxyhexyl)amino-6,7-dimethoxyquinazoline, m.p. 160–161.5° C.
(Reaction solvent: toluene)
(Crystallization from: ethyl actic/abs. ethanol-(19:1))

(B) 4 - (6 - hydroxyhexyl)amino-6,7-dimethoxyquinazoline nitrate hydronitrate
(Reaction solvent: acetic acid)

(C) 4 - (6 - hydroxyhexyl)amino-6,7-dimethoxyquinazoline nitrate
(Reaction solvent: chloroform)

(D) 4 - (6 - hydroxyhexyl)amino-6,7-dimethoxyquinazoline nitrate methanesulfonate, m.p. 143–144° C.
(Reaction solvent: chloroform)
(Crystallization from: abs. ethanol/diethyl ether).

EXAMPLE 9

4-(2,3-Dihydroxypropyl)amino-6,7-dimethoxyquinazoline dinitrates

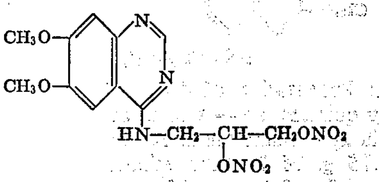

By following procedures similar to those of the preceding Examples the following are prepared:

(A) 4-(2,3 - dihydroxypropyl)amino-6,7-dimethoxy-quinazoline, m.p. 178.5–180° C.
(Reaction solvent: isopropanol)
(Crystallized from: isopropanol/benzene)

(B) 4 - (2,3 - dihydroxypropyl)amino - 6,7-dimethoxy-quinazoline dinitrate hydronitrate
(Reaction solvent: acetic acid)

(C) 4(2,3-dihydroxypropyl)amino-6,7-dimethoxy-quinazoline dinitrate
(Reaction solvent: dimethylacetamide)

(D) 4 - (2,3-dihydroxypropyl)amino-6,7-dimethoxy-quinazoline dinitrate methanesulfonate, m.p. 163–165° C. (decomp.)
(Reaction solvent: chloroform)
(Crystallization from: methanol/diethyl ether)
(Recrystallized from: abs. ethanol).

EXAMPLE 10

D(+)-4-[2-(1-hydroxybutyl)amino]-6,7-dimethoxyquinazoline nitrates

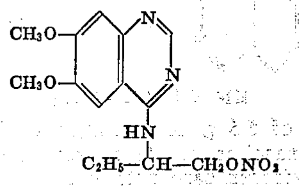

By following procedures similar to those of the preceding Examples the following are prepared:

(A) D(+) - 4 - [2 - (1 - hydroxybutyl)amino]-6,7-dimethoxyquinazoline, m.p. 195° C.
(Reaction solvent: xylene)
(Crystallized from: ethyl acetate)

(B) D(+)-4-[2-(1-hydroxybutyl)amino]-6,7-dimethoxyquinazoline nitrate hydronitrate, m.p. 132° C. and 238° C.; $\alpha_D^{25}$+72.18°
(Reaction solvent: acetic acid)
(Crystallized from: abs. ethanol/diethyl ether).

EXAMPLE 11

4-[N-ethyl-N-(3-hydroxypropyl)amino]-6,7-dimethoxyquinazoline nitrates

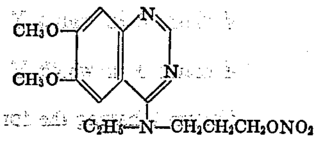

By following procedures similar to those of the preceding Examples the following are prepared:

(A) 4 - [N - ethyl - N - (3-hydroxypropyl)amino]-6,7-dimethoxyquinazoline, m.p. 118–119.5° C.
(Reaction solvent: toluene)
(Crystallized from: ethyl acetate/heptane)

(B) 4 - [N - ethyl - N - (3-hydroxypropyl)amino]-6,7-dimethoxyquinazoline nitrate hydronitrate
(Reaction solvent: acetic acid)

(C) 4 - [N - ethyl-N-(3-hydroxypropyl)amino]-6,7-dimethoxyquinazoline nitrate
(Reaction solvent: ice water)

(D) 4 - [N - ethyl-N-(3-hydroxypropyl)amino]-6,7-dimethoxyquinazoline nitrate methanesulfonate, m.p. 146.5–147.5° C.
(Reaction solvent: chloroform)
(Crystallization from : abs. ethanol/diethyl ether).

EXAMPLE 12

4-[3-Bis(2 - hydroxyethyl)aminopropylamino]-6,7 - dimethoxyquinazoline dinitrate dihydronitrate and dimethane-sulfonate

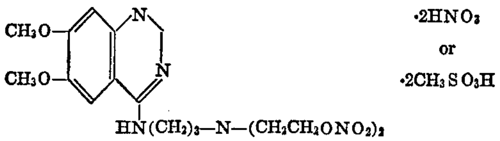

Step A: Preparation of 4-[3-bis(2-hydroxyethyl)aminopropylamino]-6,7-dimethoxyquinazoline.—A mixture of 4.49 g. of 4-chloro-6,7-dimethoxyquinazoline, bis(2-hydroxyethyl)aminopropylamine. 2.12 g. of sodium carbonate and 100 ml. of isopropanol is refluxed for 5 hours. The resulting mixture is filtered, concentrated *in vacuo* and the resulting oil crystallized from ethyl acetate on stirring. This solid is recrystallized from isopropanol/heptane to obtain 4-[3-bis(2-hydroxyethyl)aminopropylamino]-6,7-dimethoxyquinazoline, m.p. 148–149° C.

Step B: Preparation of 4-[3-bis(2-hydroxyethyl)aminopropylamino]-6,7-dimethoxyquinazoline dinitrate dihydronitrate.—A solution of 8.1 g. of 4-[3-bis(2-hydroxyethyl)aminopropylamino]-6,7-dimethoxyquinazoline in 20 ml. of glacial acetic acid is added dropwise and with stirring to a cooled (5–10° C.) mixture of 13.98 g. of acetic anhydride and 4.28 ml. of 90% nitric acid. The resulting solution is stirred for an additional 3 minutes and then treated by addition of 200 ml. of diethyl ether. The resulting solid is filtered off, washed with diethyl ether, dried and crystallized from methanol to obtain 4-[3-bis (2 - hydroxyethyl)aminopropylamino] - 6,7 - dimethoxyquinazoline dinitrate dihydronitrate, m.p. 102° C. (decomp.).

Step C: Preparation of 4-[3-bis(hydroxyethyl)aminopropylamino] - 6,7 - dimethoxyquinazoline dinitrate dimethanesulfonate.—A solution of 10.6 gm. of 4-[3-bis (2 - hydroxyethyl)aminopropylamino] - 6,7 - dimethoxyquinazoline dinitrate dihydronitrate in water is added to 105 ml. of a 1:1 molar mixture of acetic acid solution and sodium acetate solution, and the resulting solution is extracted three times each with 350 ml. of ethyl acetate. The combined ethyl acetate extracts are then washed with 70 ml. of 10% sodium hydrogen carbonate solution and with 350 ml. of water, dried with anhydrous magnesium sulfate and concentrated to an oil *in vacuo*. A solution of this oil in 30 ml. of chloroform is cooled to 0° C. and mixed with a solution of 2.53 gm. of methanesulfonic acid in 20 ml. of chloroform. The resulting solution is concentrated to an oil which crystallized on stirring with diethyl ether. This solid is filtered off, washed with diethyl ether, and dried to obtain 4-[3-bis(hydroxyethyl)aminopropylamino]-6,7-dimethoxyquinazoline dinitrate dimethanesulfonate, m.p. 73–75° C. (decomp.).

Following procedures evident from the description herein there may be also readily prepared the compound 4 - [3-bis(2-hydroxyethyl)aminopropylamino] - 6,7 - dimethoxyquinazoline dinitrate dimaleate, m.p. 105–106° C. (decomp.) after crystallization from absolute ethanol/diethyl ether.

EXAMPLE 13

4-[4-(2-Hydroxyethyl)piperazino]-6,7-dimethoxyquinazoline nitrates

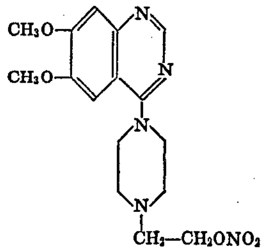

By following procedures similar to those of the preceding Examples the following are prepared:

(A) 4-[4-(2-hydroxyethyl)-1-piperazino]-6,7-dimethoxyquinazoline, m.p. 152.5–154° C.
(Reaction solvent: toluene)
(Crystallized from: benzene)

(B) 4-[4-(2-hydroxyethyl)-1-piperazino]-6,7-dimethoxyquinazoline nitrate as hydronitrate, m.p. 148–149° C. (decomp.)
(Reaction solvent: acetic acid)

(C) 4-[4-(2-hydroxyethyl)-1-piperazino]-6,7-dimethoxyquinazoline nitrate, m.p. 220° C. (decomp.)
(Reaction solvent: ice water).

(D) 4 - [4-(2-hydroxyethyl)piperazino] - 6,7-dimethoxyquinazoline nitrate methanesulfonate, m.p. 161–163° C. (decomp.)
(Reaction solvent: chloroform)
(Crystallization from: abs. ethanol/diethyl ether).

EXAMPLE 14

The following compounds of the invention are prepared following the procedure of the preceding examples:

(A) 4-(5-hydroxypentyl)amino-6,7-methylenedioxyquinazoline nitrate methanesulfonate, m.p. 167° C. (decomp.)
(Crystallized from: ethanol)

(B) 4-[3-bis(2-hydroxyethyl)aminopyropylamino]-6,7-diethoxyquinazoline dinitrate fumarate, m.p. 117° C. (decomp.)
(Crystallized from: abs. ethanol).

EXAMPLE 15

By following procedures similar to those of Example 12 the following are prepared:

(A) 4-[3-bis(hydroxyethyl)aminopropylamino-6,7-methylenedioxy-quinazoline, m.p. 141.5–143° C.
(Reaction solvent: isopropanol)
(Crystallized from: benzene)

(B) 4-[3-bis(hydroxyethyl)aminopropylamino-6,7-methylenedioxy-quinazoline dinitrate dimaleate, m.p. 95–100° C. (decomp.)
(Crystallized from: methanol/diethyl ether).

What is claimed is:

1. A compound of the formula:

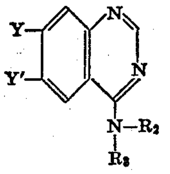

wherein
$R_2$ is —$CH_2$(—$CH_2$)$_z$—N[—$CH_2$(—$CH_2$)$_z$—OH]$_2$,
$R_3$ is hydrogen, or
$R_2$ and $R_3$ together with the 4-amino nitrogen form

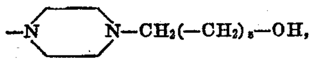

z is 1 to 4,
each of Y and Y' is alkoxy of 1 to 4 carbon atoms or Y and Y' together form methylenedioxy,
or a pharmaceutically acceptable acid addition salt thereof.

2. A compound of claim 1 of the formula:

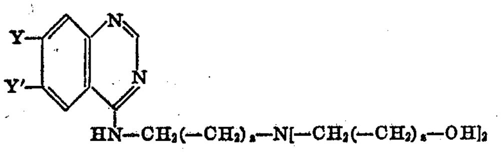

wherein
z is 1 to 4, and
each of Y and Y' is alkoxy of 1 to 4 carbon atoms or Y and Y' together form methylenedioxy,
or a pharmaceutically acceptable acid addition salt thereof.

3. A compound of claim 2 in which $R_2$ is 3-bis(2-hydroxyethyl)aminopropylamino and Y and Y' are selected from the group consisting of 6,7-dimethoxy and 6,7-diethoxy.

4. The compound of claim 3 in which Y and Y' are 6,7-dimethoxy.

5. The compound of claim 3 in which Y and Y' are 6,7-diethoxy.

6. The compound of claim 1 having the formula:

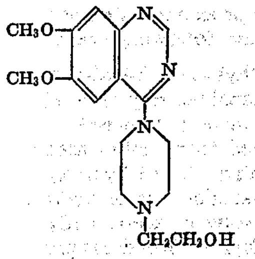

7. The compound of claim 2 in which $R_2$ is 3-bis(2-hydroxyethyl)aminopropylamino and Y and Y' together form 6,7-methylenedioxy.

References Cited

UNITED STATES PATENTS

| | | | |
|---|---|---|---|
| 3,449,498 | 6/1969 | De Stevens et al. | 424—251 |
| 3,517,005 | 6/1970 | Cronin et al. | 260—256.4 |

RAYMOND V. RUSH, Primary Examiner